United States Patent
Gray et al.

(10) Patent No.: US 6,438,476 B1
(45) Date of Patent: Aug. 20, 2002

(54) VEHICLE SEAT OCCUPANT CHARACTERIZATION METHOD INCLUDING ULTRALIGHT CHILD SEAT DETECTION

(75) Inventors: Charles A. Gray, Noblesville; James F. Patterson, Greentown, both of IN (US); Thomas Fischer, Wenden (DE)

(73) Assignee: Delphi Technologies, Inc., Troy, MI (US)

( * ) Notice: Subject to any disclaimer, the term of this patent is extended or adjusted under 35 U.S.C. 154(b) by 0 days.

(21) Appl. No.: 10/083,729

(22) Filed: Feb. 27, 2002

(51) Int. Cl.⁷ .............................................. G06F 17/00
(52) U.S. Cl. ........................................ 701/45; 280/735
(58) Field of Search .............................. 701/35, 45, 46, 701/47; 280/734, 735, 801.1, 802; 180/271, 282, 268, 273; 177/209; 297/DIG. 3, 452.41, 195.12, 284.6; 340/436, 665, 666, 667

(56) References Cited

U.S. PATENT DOCUMENTS

| | | | |
|---|---|---|---|
| 5,957,491 A | * 9/1999 | Cook et al. ............... 280/735 |
| 5,987,370 A | 11/1999 | Murphy et al. ............... 701/45 |
| 6,058,341 A | * 5/2000 | Myers et al. ............... 280/735 |
| 6,089,106 A | * 7/2000 | Patel et al. ............... 280/735 |
| 6,099,032 A | * 8/2000 | Cuddihy et al. ............. 280/735 |
| 6,101,436 A | * 8/2000 | Fartune et al. ............. 280/735 |
| 6,161,070 A | * 12/2000 | Finno et al. ............... 701/45 |
| 6,246,936 B1 | 6/2001 | Murphy et al. ............... 701/45 |

* cited by examiner

Primary Examiner—Richard M. Camby
(74) Attorney, Agent, or Firm—Robert M. Sigler

(57) ABSTRACT

An improved weight-based occupant characterization method reliably distinguishes between an empty seat and a seat occupied by an ultralight child seat. The seat occupancy is initially characterized using a primary classification technique in which the measured seat pressure is compared to an allow threshold representative of a minimum weight adult. If the primary classification technique determines that the seat is empty and a seat belt for the passenger seat is buckled, a secondary classification technique is initiated to compare the measured seat pressure to a predetermined pressure range characteristic of occupied ultralight child seats. If the measured pressure falls within the ultralight child seat range, characterization of the primary classification technique is discarded in favor of the characterization of the secondary classification technique.

4 Claims, 3 Drawing Sheets

VEHICLE SEAT OCCUPANT CHARACTERIZATION METHOD INCLUDING ULTRALIGHT CHILD SEAT DETECTION

TECHNICAL FIELD

This invention relates to a method of characterizing the occupant of a motor vehicle seat for purposes of allowing or suppressing air bag deployment based on sensed occupant weight, and more particularly to a method of distinguishing an empty seat from a seat having an ultralight child seat placed on it.

BACKGROUND OF THE INVENTION

Vehicle occupant weight detection systems are useful in connection with air bags and other pyrotechnically deployed restraints as a means of characterizing the occupant for purposes of determining whether to allow or suppress deployment of the restraints. For example, it is generally desired to allow deployment for a child or small adult, and to suppress deployment (or reduce deployment force) for a small child. In the case of infant or child seats (referred to herein collectively as child seats) that are placed on the vehicle seat and cinched down with a seat belt, it is generally believed that deployment should be suppressed entirely.

As disclosed in U.S. Pat. No. 6,246,936, issued Jun. 12, 2001 and assigned to the assignee of the present invention, a tightly cinched child seat can be distinguished from a small adult (such as a $5^{th}$ percentile adult female) by detecting the variation in the sensed weight during vehicle movement. The occupant is characterized as a child or small adult if the variation exceeds a threshold, whereas the occupant is characterized as a child seat if the variation is below the threshold, as a tightly cinched seat belt severely restricts variance.

An issue that is not addressed in the above-mentioned patent application, however, concerns distinguishing between an empty seat and a seat occupied by an ultralight child seat of the type designed for newborn babies. Although deployment of the inflatable restraints will be suppressed in either event (empty seat or small child), it is important to know when the seat is truly empty for purposes of adaptive calibration. Additionally, in applications where the occupant characterization and suppression status are displayed for driver verification of proper system operation, it is confusing for the displayed status indicate empty seat when an ultralight child seat is present. Accordingly, what is needed is a method of more accurately distinguishing between an empty seat and a seat occupied by an ultralight child seat, and for displaying an accurate status message to the drive of the vehicle.

SUMMARY OF THE INVENTION

The present invention is directed to an improved weight-based occupant characterization method that reliably distinguishes between an empty seat and a seat occupied by an ultralight child seat. According to the invention, the seat occupancy is initially characterized using a primary classification methodology in which the measured seat pressure is compared to an allow threshold representative of a minimum weight adult. If the primary classification methodology determines that the seat is empty and a seat belt for the passenger seat is buckled, a secondary classification methodology is initiated to compare the measured seat pressure to a predetermined pressure range characteristic of occupied ultralight child seats. If the measured pressure falls within the ultralight child seat range, characterization of the primary classification methodology is discarded in favor of the characterization of the secondary classification methodology.

DESCRIPTION OF THE PREFERRED EMBODIMENT

The present invention is disclosed in the context of a restraint system for an occupant of a vehicle passenger seat 10, where the occupant weight is detected based on the fluid pressure in a seat cushion bladder 12. In general, however, the present invention applies to other types of weight-based occupant detection systems as well, such as systems that sense the strain in a seat frame element, or systems that include a network of pressure sensitive cells distributed over the seating area.

Figure 1:
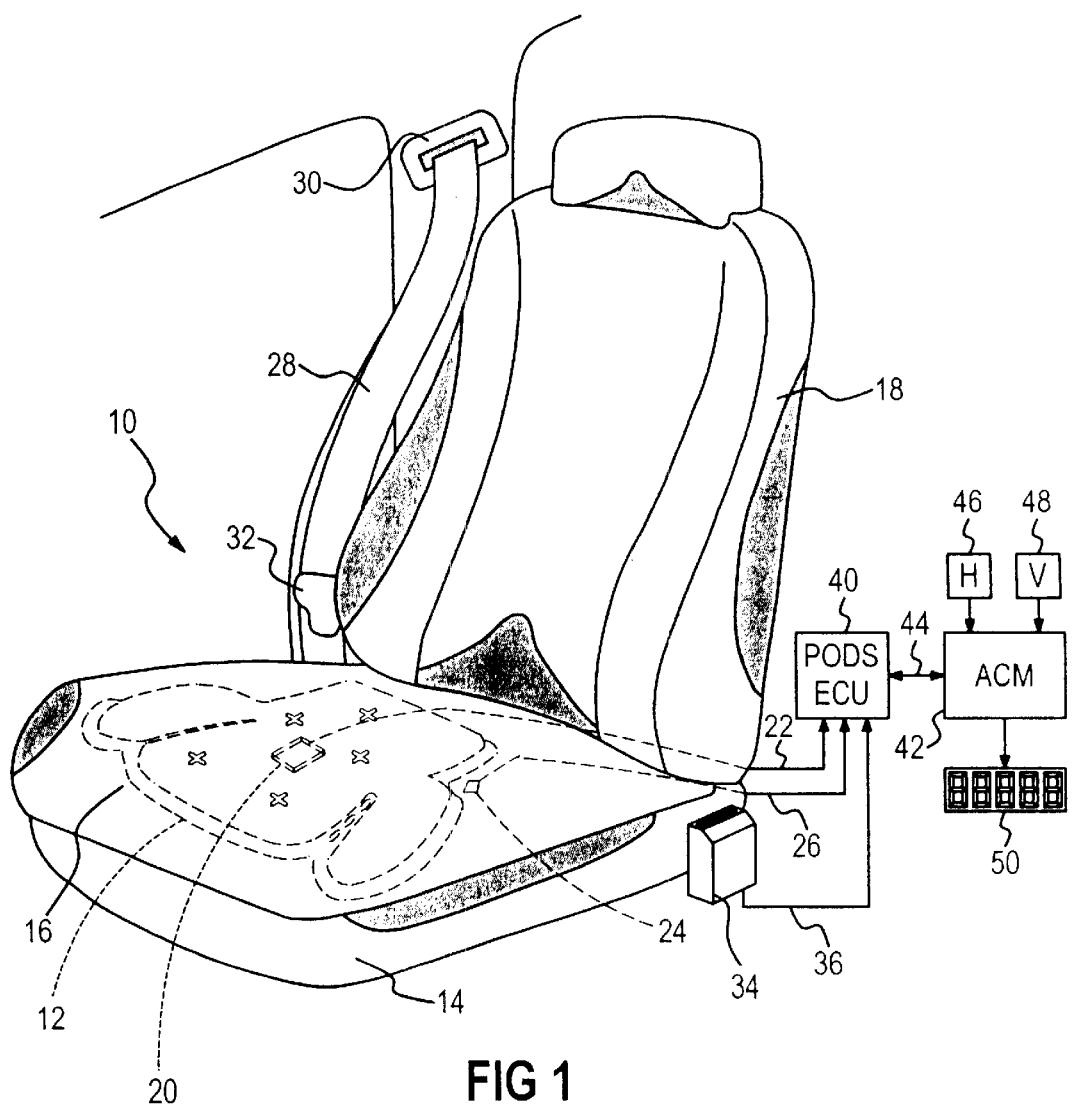
FIG. 1 is a system diagram illustrating a passenger seat of a vehicle equipped with a fluid-filled bladder, a passenger occupant detection electronic control unit (PODS ECU) and an airbag control module (ACM) according to this invention.

Referring to FIG. 1, the vehicle seat 10 is supported on a frame 14, and includes foam cushions 16 and 18 on the seat bottom and back. The bladder 12 is disposed in or under the foam cushion 16 substantially parallel with the central seating surface, and preferably contains a fluid such as silicone which is non-corrosive, and not subject to freezing at extreme ambient temperatures. In addition, a rigid backplate may be placed under the bladder 12 to provide a suitable reaction surface, as disclosed for example in the U.S. patent application Ser. No. 09/311,576, filed May 14, 1999, assigned to the assignee of the present invention, and incorporated herein by reference.

The bladder 12 is coupled to a pressure sensor 20, which provides an electrical output signal on line 22 indicative of the fluid pressure in the bladder 12. A temperature sensor 24 located in proximity to the bladder 12 provides an electrical output signal on line 26 indicative of the bladder and foam temperature. The sensor 24 can be provided as a separate sensor as indicated in FIG. 1, or may be integrated with the pressure sensor 20.

As also shown in FIG. 1, the seat 10 is equipped with a conventional shoulder/lap seat belt 28 anchored to the vehicle floor (not shown) and B-pillar 30. In use, the belt 28 is drawn around an occupant or through the frame of a child or infant seat, and a clip 32 slidably mounted on the belt 28 is inserted into the buckle 34 to fasten the belt 28 in place. A retractor assembly (not shown) mounted in the B-pillar 30 maintains a desired tension on the belt 28, and locks the belt 28 in place when the vehicle experiences significant deceleration. A sensor (not shown) within the buckle 34 detects insertion of the clip 32, and provides an electrical signal on the line 36 indicative of the seat belt latch status (i.e., buckled or unbuckled).

The electrical pressure, temperature and seat belt latch status signals on lines 22, 26 and 36 are provided as inputs to a passenger occupant detection system electronic control unit (PODS ECU) 40, which in turn, is coupled to an airbag control module (ACM) 42 via bi-directional communication bus 44. The ACM 42 may be conventional in nature, and operates to deploy one or more airbags or other restraint devices (not shown) for vehicle occupant protection based on the vertical and/or horizontal acceleration signals obtained from vertical acceleration sensor (V) 48 and horizontal acceleration sensor (H) 46, and occupant characterization data obtained from PODS ECU 40. In general, ACM 42 deploys the restraints if the acceleration signals indicate the occurrence of a severe crash, unless the PODS ECU 40 indicates that deployment should be suppressed. Of course, other more sophisticated controls are also possible, such as controlling the deployment force of the restraint devices based on the occupant characterization data provided by PODS ECU 40. Also, ACM 42 communicates the suppression status to a driver display device 50 to enable the driver to verify proper system operation.

In the illustrated embodiment, the primary function of PODS ECU 40 is to estimate occupant weight based on the pressure and temperature signal provided by the sensors 20 and 24, as described for example in the U.S. Pat. No. 5,987,370 to Murphy et al. (which is incorporated by reference herein), and to reliably distinguish between an empty seat and a seat having an object or unrestrained child sitting on it. Essentially, the relationship between occupant weight and the sensed pressure is empirically determined at a variety of temperatures, and the data is used to construct either a mathematical model or a multi-dimensional look-up table of occupant weight as a function of temperature and sensed pressure, with the model or table programmed into PODS ECU 40 and used to determine the occupant weight.

According to the present invention, the difficulty in distinguishing between an empty seat and a seat occupied by an ultralight child seat is resolved by initially characterizing the seat occupancy using a primary classification technique in which the measured seat pressure is compared to an allow threshold THR—ALLOW representative of a minimum weight adult. If the primary classification technique determines that the seat is empty (i.e., STATUS =EMPTY SEAT) and the seat belt 28 is buckled, a secondary classification technique is initiated to compare the measured seat pressure to a predetermined pressure range characteristic of occupied ultralight child seats. If the measured pressure falls within the ultralight child seat range, characterization of the primary classification technique is discarded in favor of the characterization of the secondary classification technique.

Figure 2:
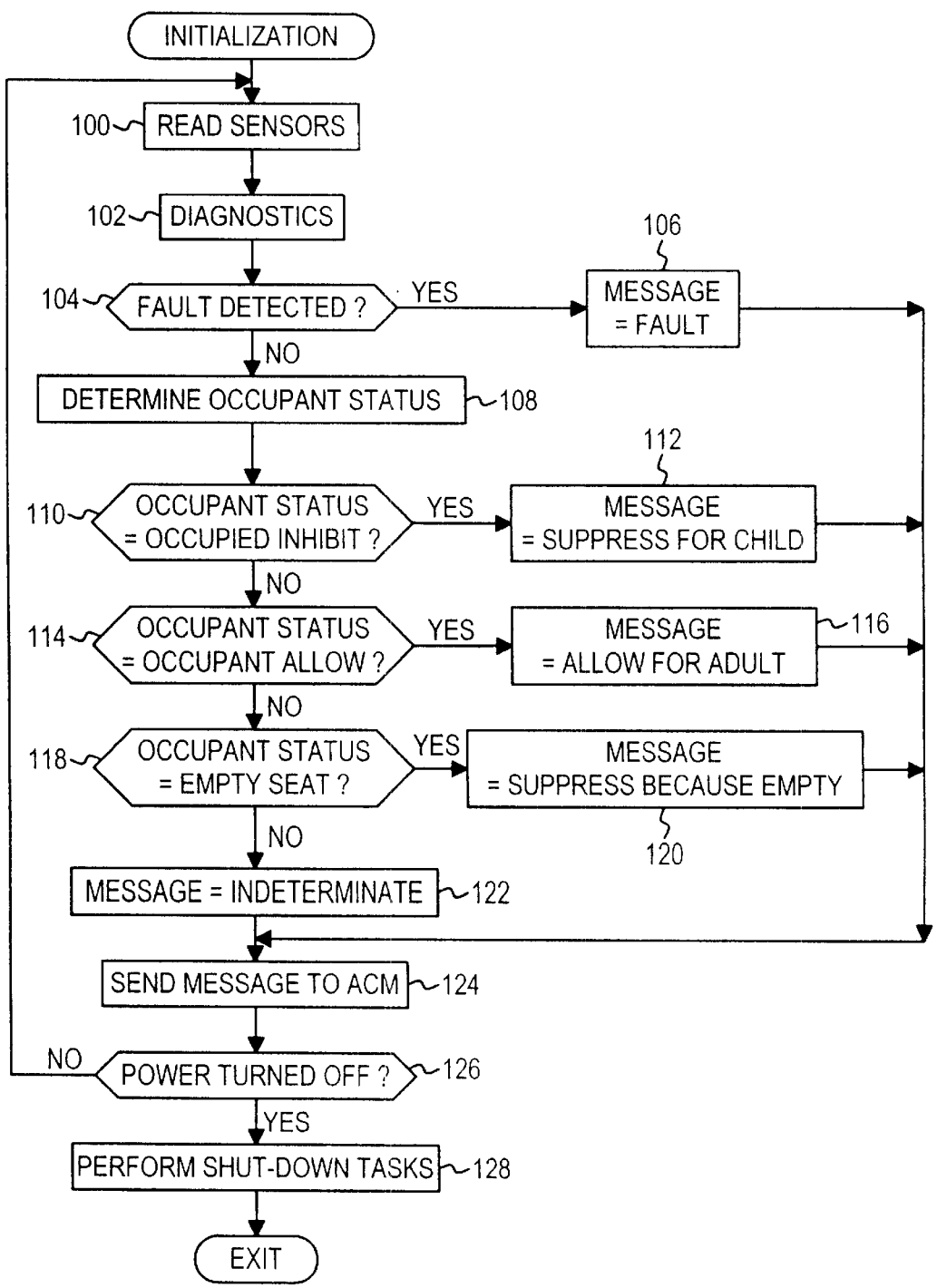
FIGS. 2 and 3 depict a flow diagram representative of a software routine executed by the PODS ECU of FIG. 1 in carrying out the method of this invention.
Figure 3:
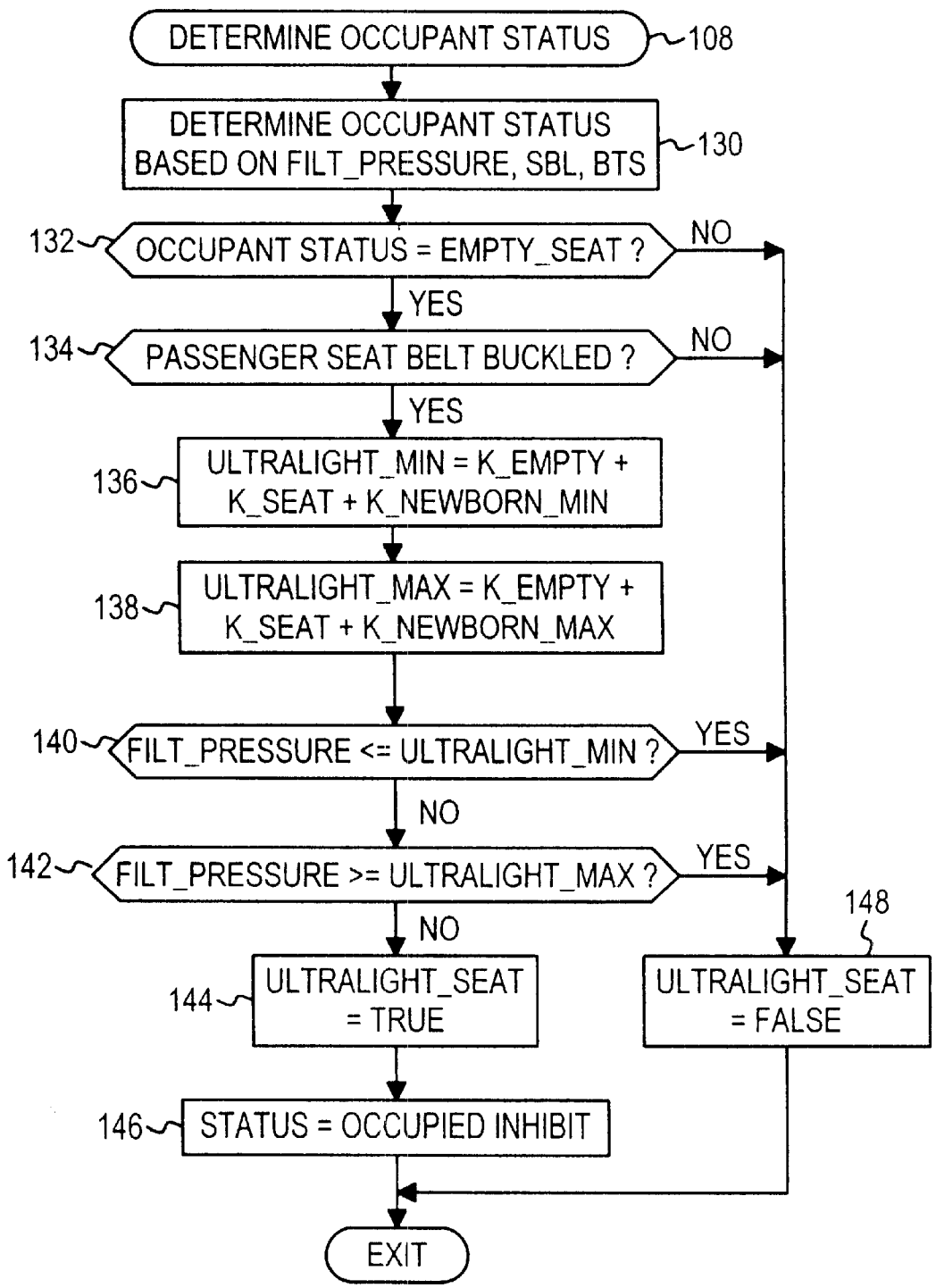

The flow diagrams of FIGS. 2–3 illustrate a software routine periodically executed by the PODS ECU 40 for carrying out this invention. The flow diagram of FIG. 2 represents a main or executive routine, whereas the flow diagram of FIG. 3 details occupant status determination. At the initiation of each period of vehicle operation, the PODS ECU 40 executes an initialization routine as indicated by block 90 of FIG. 2 for initializing various registers, parameters and flags to zero or some other default setting. In the case of this invention, for example, the suppression status (STATUS) may be initialized to a default setting, or to a setting determined in the previous ignition cycle. A similar initialization also occurs in the event of a dynamic reset. Following initialization, the blocks 100–126 are repeatedly executed as shown. The blocks 100 and 102 read all of the sensor information (which may include seat belt tension information) and perform diagnostic testing of the system and components. If the diagnostic testing detects a fault, the block 104 is answered in the affirmative, and the block 106 sets the status message to FAULT. Otherwise, the block 108 is executed to determine occupant status as detailed in the flow diagram of FIG. 3. If the occupant status is OCCUPIED INHIBIT, as determined at block 110, the block 112 sets the status message to SUPPRESS FOR CHILD. If the occupant status is OCCUPANT ALLOW, as determined at block 114, the block 116 sets the status message to ALLOW FOR ADULT. And if the occupant status is EMPTY SEAT, as determined at block 118, the block 120 sets the status message to SUPPRESS BECAUSE EMPTY. If blocks 110, 114, and 118 are answered in the negative, the block 122 sets the status message to INDETERMINATE. The block 124 then sends the determined occupant status message to ACM 42, and the block 126 checks for removal of system power. When system power is removed, the block 128 is executed to perform shut-down tasks, and the routine is exited.

Referring now to FIG. 3, the block 130 is initially executed to determine occupant status using a primary classification technique based on a filtered version (FILT—PRESSURE) of the detected pressure in bladder 12 and other indicia such as the seat belt latch status (SBL) and a measure of the seat belt tension (BTS). For example, the occupant status may be set to EMPTY SEAT when FILT—PRESSURE is below a threshold determined in relation to the factory calibrated fluid pressure in bladder 12, to OCCUPIED INHIBIT when FILT—PRESSURE is below a threshold (THR—ALLOW) indicative of a minimum weight adult (such as a $5^{th}$ percentile adult female), and to OCCUPIED ALLOW when FILT—PRESSURE is above THR—ALLOW.

Once block 130 has determined the occupant status using the primary classification technique, the blocks 132–134 are executed to determine if a secondary classification technique should be used to distinguish an empty seat from a seat occupied by an ultralight child seat. Essentially, the secondary classification technique is utilized when the primary classification technique determines that the seat 10 is empty (as determined at block 132) and when the seat belt latch (SBL) signal on line 36 indicates that the seat belt 28 is buckled (as determined at block 134). If blocks 132 and 134 are both answered in the affirmative, the blocks 136–146 are executed to perform the secondary classification technique; if block 132 or 134 are answered in the negative, the block 148 sets the ULTRALIGHT—SEAT flag to FALSE, completing the occupant status determination. The blocks 136 and 138 compute pressure thresholds ULTRALIGHT—MIN, ULTRALIGHT—MAX representing minimum and maximum expected pressure values for an ultralight child seat occupied by an infant. Both thresholds are based on the summation of the calibrated (or learned) empty seat pressure K—EMPTY, a pressure K—SEAT corresponding to the weight of an ultralight child seat, and a predetermined constant K—NEWBORN—MIN or K—NEWBORN—MAX corresponding to the minimum and maximum expected weights of an infant occupying the child seat. The blocks 140 and 142 then respectivley compare FILT—PRESSURE to the thresholds ULTRALIGHT—MIN and ULTRALIGHT—MAX. If FILT—PRESSURE lies between the two thresholds, blocks 140 and 142 will be answered in the negative, and blocks 144 and 146 are executed to set the ULTRALIGHT—SEAT flag to TRUE and to set STATUS to OCCUPPIED INHIBIT, completing the occupant status determination. When the block 110 of FIG. 2 is subsequently executed, it will be answered in the affirmative, and block 112 will change the status message from EMPTY SEAT to SUPPRESS FOR CHILD. If FILT—PRESSURE is outside the pressure range defined by ULTRALIGHT—MIN and ULTRALIGHT—MAX, the block 148 sets the ULTRALIGHT—SEAT flag to FALSE, and the status message remains EMPTY SEAT.

In summary, the present invention provides a simple and reliable method of distinguishing between an empty seat and a seat occupied by an ultralight child seat, and advising the driver accordingly. While illustrated in reference to the illustrated embodiment, it is expected that various modifications will occur to persons skilled in the art. For example, this invention is not limited to pressure based bladder systems, and may be applied equally as well to other occupant detection systems, as indicated above. Accordingly, it should be understood that occupant characterization methods incorporating these and other modifications may fall within the scope of this invention, which is defined by the appended claims.

What is claimed is:

1. A method of operation for an occupant detection system that allows or suppresses deployment of an inflatable restraint in a vehicle based on an output signal responsive to weight applied to a vehicle seat, the method comprising the steps of:

initially characterizing seat occupancy using a primary classification methodology during a period of vehicle operation prior to movement of said vehicle, where said primary classification methodology identifies an empty seat when a magnitude of said output signal is lower than a calibrated threshold;

characterizing seat occupancy using a secondary classification methodology if said primary classification methodology identified an empty seat and a seat belt for said vehicle seat is in use, where said secondary classification methodology distinguishes between an empty seat and a seat occupied by an ultralight child seat based on the magnitude of said output signal relative to a determined range of magnitudes; and displaying seat occupancy based on the characterization of said primary classification methodology until said secondary classification methodology distinguishes between an empty seat and a seat occupied by an ultralight child seat, and thereafter displaying seat occupancy based on the characterization of said secondary classification methodology.

2. The method of claim 1, wherein said determined range of magnitudes is representative of occupied ultralight child seats, and said secondary classification methodology distinguishes an ultralight child seat from an empty seat when the magnitude of said output signal is in said determined range.

3. The method of claim 1, wherein said determined range of magnitudes is representative of occupied ultralight child seats, and said secondary classification methodology distinguishes an empty seat from an ultralight child seat when the magnitude of said output signal is outside said determined range.

4. The method of claim 1, wherein said determined range of magnitudes is defined by a lower and upper thresholds that are periodically computed to reflect identified variation in the output signal that occurs when said seat is empty.

* * * * *